UNITED STATES PATENT OFFICE.

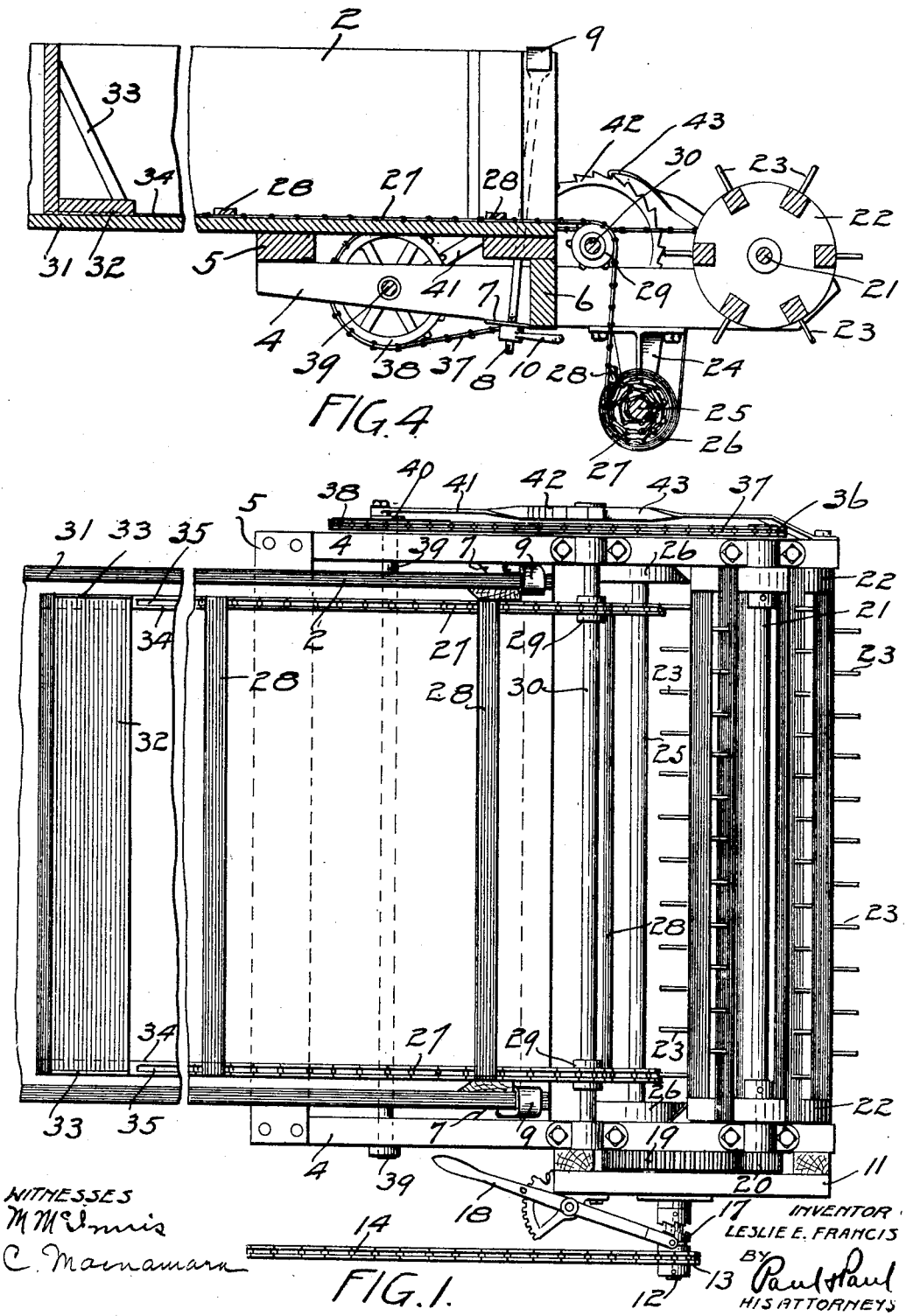

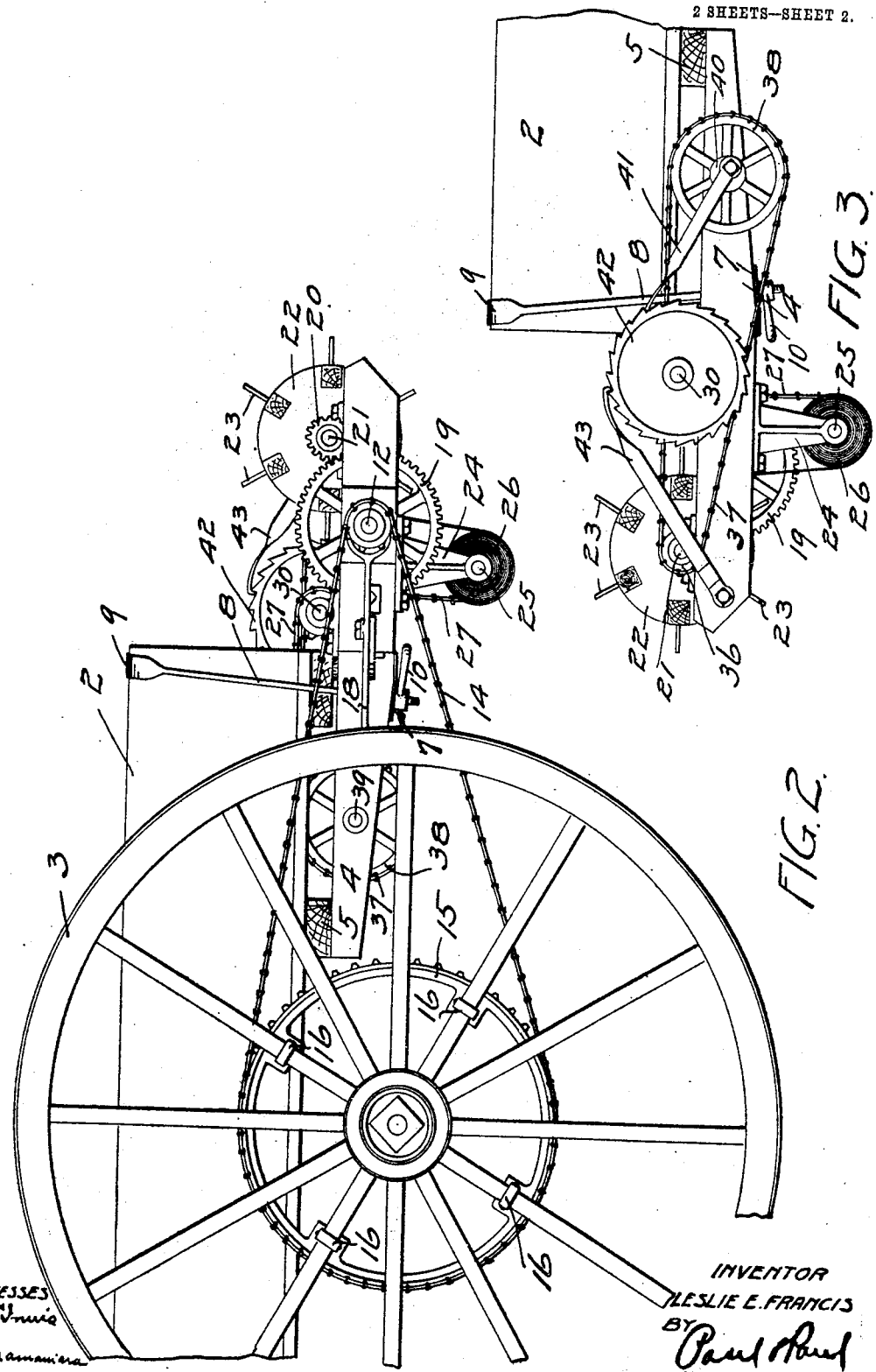

LESLIE E. FRANCIS, OF SPIRIT LAKE, IOWA.

DETACHABLE MANURE-SPREADER.

No. 804,003.  Specification of Letters Patent.  Patented Nov. 7, 1905.

Application filed December 5, 1904. Serial No. 235,426.

*To all whom it may concern:*

Be it known that I, LESLIE E. FRANCIS, of Spirit Lake, Dickinson county, Iowa, have invented certain new and useful Improvements in Detachable Manure-Spreaders, of which the following is a specification.

The object of my invention is to provide a spreader that is adapted to be temporarily attached to the rear end of a wagon-box while the wagon is being used for hauling fertilizing material and easily and quickly removed when it is desired to use the wagon for other purposes.

A further object is to provide a manure-spreading apparatus of simple but strong and durable construction and one that will be very efficient for the purpose of discharging and spreading the manure.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of the rear end of a wagon-box with my invention applied thereto. Fig. 2 is a side elevation of the same. Fig. 3 is a similar view looking toward the opposite side of the wagon and spreader. Fig. 4 is a transverse vertical section through the spreader and lengthwise of the wagon-box.

In the drawings, 2 represents a wagon-box of an ordinary farm-wagon having a rear wheel 3, from which the power to drive the spreader is preferably derived.

4 represents the side bars of the spreader-frame connected by cross-pieces 5 and 6, that are adapted to bear against the under side of the wagon-body without being secured thereto.

7 represents plates secured to the under side of the spreader-frame, preferably at the angle between the sides 4 and cross-piece 6, and are provided with holes to receive rods 8, that have hooks 9 at their upper ends to detachably engage the upper edge of the wagon-box sides and threaded lower ends provided with handles 10, which when turned up against the plates 7 serve to draw the spreader-frame snugly against the bottom of the wagon-box and lock it securely against accidental movement while the apparatus is in use.

The weight of the operating parts of the spreader will tend to hold the inner end of the frame against the box, and it is only necessary to clamp the middle portion of the frame to insure its rigidity. A block 11 is bolted to one of the side pieces at the outer end of the frame and carries a stub-shaft 12, having a sprocket 13 connected by a chain 14 with a sprocket 15, that is secured to the spokes of the rear wheel by clamps 16. A clutch 17 is mounted on the shaft 12, operated by a lever 18 in the usual way, by means of which the operator can throw the spreading mechanism into or out of gear with the rear wheel and start or stop the operation of the spreader. A gear 19 is mounted on the shaft 12, meshing with a pinion 20 on a shaft 21, that carries a cylinder 22, provided on its periphery with rows of teeth or pins 23, that engage and spread the manure. This cylinder can be operated at any desired speed by varying the size of the gears between it and the rear wheel of the wagon. On the under side of the frame I provide brackets or hangers 24, carrying a shaft 25, that is connected with one end of a spring 26, whose opposite end is secured to the spreader-frame, as shown in Fig. 4. The tension of this spring tends to revolve the shaft in one direction and wind up the apron thereon. The apron which I prefer to employ consists of sprocket-chains 27, connected at intervals by cross bars or slats 28 and adapted to travel over sprocket-wheels 29, mounted on a shaft 30, that has bearings in the spreader-frame in the rear of the wagon-box and near the level of the floor thereof, the peripheries of the sprocket-wheels 29 at one point in their revolution being on substantially the same level as said floor.

31 represents the forward end of the wagon-box, slidably arranged therein, having a plate 32, that rests upon the floor of the box and slides thereon and connected with said end by braces 33. This plate 32 is connected by straps 34 with one end of the apron, and these straps have longitudinal slots 35, that receive the teeth of the sprockets 29 when the end-board reaches the rear of the wagon-box and causes the stopping of the apron at that point. A sprocket 36 is mounted on the shaft 21 at the opposite end from the pinion 20 and is connected by a chain 37 with a sprocket-wheel 38 on a shaft 39, mounted in the frame of the spreader beneath the wagon-box. A crank-disk 40 is mounted on the shaft 39 and carries an arm 41, that engages the teeth of a ratchet 42, secured on the shaft 30, and imparts a step-by-step movement thereto with every revolution of the shaft 39. The step-by-step movement of the ratchet 42 will move the shaft 30 correspondingly and draw the apron, with the end-board attached thereto, back to the rear end of the wagon-box and slowly feed the manure out of the wagon into the path of the revolving toothed cylinder, which will separate it and spread it evenly over the ground as the wagon moves along. A dog 43 is mounted on the spreader-frame and engages the teeth of the ratchet 42 and prevents backward movement thereof.

The operation of the spreader is as follows: The frame having been suspended beneath the open end of the wagon-box and clamped thereto, the wagon is set in motion and the load gradually fed backward as the apron is wound upon the shaft 25. When the end-board reaches the rear of the box, the teeth of the sprockets 29 will enter the slots 35 and movement of the apron will cease, and the load having been discharged the operator can grasp the end-board and drag it back to the forward end of the wagon, unwinding the apron against the tension of its spring 26. The operation may then be repeated, it being only necessary to reset the end-board and apron after each load is discharged and throw the spreader mechanism into and out of gear with the driving-wheel before the spreading operation begins and while the wagon is being returned to the stables for another load.

When it is desired to use the wagon for another purpose, the clamping-handles 10 are loosened and the spreader-frame detached from the box.

I claim as my invention—

1. The combination, with a wagon-box having an open rear end, of a frame carried thereby, a revolving cylinder having a series of teeth, a sprocket mounted on the shaft of said cylinder, a second larger sprocket mounted on said frame in advance of said cylinder, a chain connecting said sprockets, a slatted apron, a shaft whereon said apron is wound, a second shaft in advance of said cylinder and over which said apron passes, a large gear carried by said second shaft, a crank-disk mounted on the shaft of said second sprocket, and an arm carried by said crank-disk and arranged to engage the teeth of said large gear, for the purpose specified.

2. The combination, with a wagon-box having an open rear end, of a frame comprising side bars 4 and cross-bars 5 and 6, said side bars being beneath and parallel with the bottom of said box and said cross-bar 5 bearing against the bottom of said box and said bar 6 against the end rail thereof, and rods connected to said side bars near said cross-bars 6 and having hooked upper ends to engage the top of said box, and said frame being removable from said box, and a manure-spreading apparatus carried by said frame, substantially as described.

In witness whereof I have hereunto set my hand this 28th day of November, 1904.

LESLIE E. FRANCIS.

Witnesses:
RICHARD PAUL,
C. MACNAMARA.